(12) United States Patent
Kirk et al.

(10) Patent No.: US 9,928,420 B2
(45) Date of Patent: Mar. 27, 2018

(54) DEPTH IMAGING SYSTEM BASED ON STEREO VISION AND INFRARED RADIATION

(71) Applicant: Microsoft Technology Licensing, LLC, Redmond, WA (US)

(72) Inventors: Adam G. Kirk, Renton, WA (US); Oliver A. Whyte, Seattle, WA (US); Sing Bing Kang, Redmond, WA (US); Charles Lawrence Zitnick, III, Seattle, WA (US); Richard S. Szeliski, Bellevue, WA (US); Shahram Izadi, Cambridge (GB); Christoph Rhemann, Cambridge (GB); Andreas Georgiou, Cambridge (GB); Avronil Bhattacharjee, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 459 days.

(21) Appl. No.: 13/925,762

(22) Filed: Jun. 24, 2013

(65) Prior Publication Data

US 2014/0307058 A1 Oct. 16, 2014

Related U.S. Application Data

(60) Provisional application No. 61/812,232, filed on Apr. 15, 2013.

(51) Int. Cl.
*H04N 13/00* (2006.01)
*H04N 5/33* (2006.01)
(Continued)

(52) U.S. Cl.
CPC .......... *G06K 9/00536* (2013.01); *B29C 64/00* (2017.08); *B29C 64/386* (2017.08);
(Continued)

(58) Field of Classification Search
CPC .. G02B 27/4205; G02B 27/44; G02B 5/1895; G06F 12/0207; G06K 9/00201;
(Continued)

(56) References Cited

U.S. PATENT DOCUMENTS 5,739,906 A * 4/1998 Evans ..................... G01B 11/06
356/503
7,565,003 B2 7/2009 Ashizaki et al.
(Continued)

FOREIGN PATENT DOCUMENTS

CN 1445724 A 10/2003
CN 102638692 A 8/2012
(Continued)

OTHER PUBLICATIONS

"International Search Report & Written Opinion Issued in PCT Patent Application No. PCT/US2014/033916", dated Jul. 18, 2014, 8 Pages.
(Continued)

*Primary Examiner* — Jessica M Prince

(57) ABSTRACT

The subject disclosure is directed towards a high resolution, high frame rate, robust stereo depth system. The system provides depth data in varying conditions based upon stereo matching of images, including actively illuminated IR images in some implementations. A clean IR or RGB image may be captured and used with any other captured images in some implementations. Clean IR images may be obtained by using a notch filter to filter out the active illumination pattern. IR stereo cameras, a projector, broad spectrum IR LEDs and one or more other cameras may be incorporated into a single device, which may also include image processing components to internally compute depth data in the device for subsequent output.

19 Claims, 8 Drawing Sheets

(51) Int. Cl.
*G06K 9/00* (2006.01)
*G06K 9/62* (2006.01)
*G06F 11/30* (2006.01)
*G06F 3/06* (2006.01)
*G06F 9/30* (2018.01)
*G06F 12/02* (2006.01)
*G06F 12/00* (2006.01)
*B29C 64/386* (2017.01)
*H04N 13/02* (2006.01)
*G02B 27/42* (2006.01)
*G02B 5/18* (2006.01)
*G02B 27/44* (2006.01)
*H04N 5/225* (2006.01)
*H04N 9/04* (2006.01)
*H04N 17/00* (2006.01)
*G01B 11/25* (2006.01)
*G01B 11/22* (2006.01)
*G06T 1/60* (2006.01)
*G06T 7/00* (2017.01)
*G06T 7/586* (2017.01)
*B29C 64/00* (2017.01)
*A63F 13/213* (2014.01)

(52) U.S. Cl.
CPC ............ *G01B 11/22* (2013.01); *G01B 11/25* (2013.01); *G01B 11/2513* (2013.01); *G01B 11/2527* (2013.01); *G01B 11/2545* (2013.01); *G02B 5/1895* (2013.01); *G02B 27/4205* (2013.01); *G02B 27/44* (2013.01); *G06F 3/0653* (2013.01); *G06F 3/0659* (2013.01); *G06F 3/0683* (2013.01); *G06F 9/3004* (2013.01); *G06F 9/30043* (2013.01); *G06F 9/30127* (2013.01); *G06F 11/3024* (2013.01); *G06F 12/00* (2013.01); *G06F 12/02* (2013.01); *G06F 12/0207* (2013.01); *G06F 12/0292* (2013.01); *G06K 9/0063* (2013.01); *G06K 9/00201* (2013.01); *G06K 9/62* (2013.01); *G06T 1/60* (2013.01); *G06T 7/00* (2013.01); *G06T 7/586* (2017.01); *H04N 5/2256* (2013.01); *H04N 5/33* (2013.01); *H04N 5/332* (2013.01); *H04N 9/045* (2013.01); *H04N 13/0022* (2013.01); *H04N 13/02* (2013.01); *H04N 13/025* (2013.01); *H04N 13/0239* (2013.01); *H04N 13/0253* (2013.01); *H04N 13/0271* (2013.01); *H04N 17/002* (2013.01); *A63F 13/213* (2014.09); *G02B 27/4233* (2013.01); *G06T 2207/30244* (2013.01); *H04N 2013/0081* (2013.01)

(58) Field of Classification Search
CPC ............ G06K 9/00536; G06K 9/0063; G06T 2207/30244; G06T 7/0073; G06T 1/60; G06T 7/00; G06T 7/586; H04N 13/0022; H04N 13/02; H04N 13/0239; H04N 13/025; H04N 13/0253; H04N 13/0271
USPC ................................................. 348/47
See application file for complete search history.

(56) References Cited

U.S. PATENT DOCUMENTS

| | | | |
|---|---|---|---|
| 2004/0125222 A1* | 7/2004 | Bradski | H01L 27/14647 348/272 |
| 2006/0210146 A1* | 9/2006 | Gu | G01B 11/25 382/154 |
| 2011/0222757 A1* | 9/2011 | Yeatman, Jr. | H04N 13/026 382/154 |
| 2011/0228097 A1* | 9/2011 | Motta | H04N 5/33 348/164 |
| 2012/0056982 A1* | 3/2012 | Katz | H04N 13/025 348/43 |
| 2013/0083062 A1 | 4/2013 | Geisner et al. | |
| 2013/0100256 A1* | 4/2013 | Kirk | G06T 7/0057 348/48 |
| 2013/0215235 A1* | 8/2013 | Russell | H04N 13/0203 348/47 |
| 2014/0055560 A1* | 2/2014 | Fu | H04N 13/0022 348/42 |

FOREIGN PATENT DOCUMENTS

| | | |
|---|---|---|
| CN | 102831380 A | 12/2012 |
| WO | 2012137434 A1 | 10/2012 |

OTHER PUBLICATIONS

"Second Written Opinion Issued in PCT Patent Application No. PCT/US2014/033916", dated Mar. 27, 2015, 6 Pages.
Kanade, et al., "Development of a Video-rate Stereo Machine", In Proceedings of the International Conference on Intelligent Robots and Systems 95, 'Human Robot Interaction and Cooperative Robots', Aug. 1995, vol. 3, pp. 95-100.
"International Preliminary Report on Patentability Issued in PCT Patent Application No. PCT/US2014/033916", dated Jul. 13, 2015, 7 Pages.
"First Office Action and Search Report Issued in Chinese Patent Application No. 201480021460.0", dated Mar. 28, 2017, 17 Pages.
"Second Office Action Issued in Chinese Patent Application No. 201480021460.0", dated Dec. 11, 2017, 8 Pages.

* cited by examiner

DEPTH IMAGING SYSTEM BASED ON STEREO VISION AND INFRARED RADIATION

CROSS-REFERENCE TO RELATED APPLICATION

The present application claims priority to U.S. provisional patent application Ser. No. 61/812,232, filed Apr. 15, 2013.

BACKGROUND

In active depth sensing, a projector projects patterns of light such as infrared (IR) dots to illuminate a region being sensed. The projected patterns are captured by a camera/sensor (two or more in stereo systems), with the image (or images) processed to compute a depth map or the like, e.g., per frame.

In stereo systems, stereo cameras capture two images from different viewpoints. Then, for example, one way to perform depth estimation with a stereo pair of images is to find correspondences between the images, e.g., to correlate intensity variations due to natural texture in one image with intensity variations in the other image.

However, existing depth systems/devices suffer from a number of drawbacks. Some systems use passive depth sensing, which is less accurate than active depth sensing. Some systems require that the projector be calibrated so that the exact pattern is generally known, which means if another such device is present, or if the laser pattern shifts (such as due to temperature), the device is unable to function properly. Other systems do not work in environments where ambient light overwhelms the projected light.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards a robust depth sensing system, including one or more implementations having one or more infrared (IR) cameras configured to capture one or more actively illuminated images of a scene. A projector outputs an active illumination pattern at an IR frequency or frequencies that are capable of being filtered out by a notch filter while being sensed by the one or more infrared cameras.

In one or more aspects, a plurality of IR cameras is configured to sense stereo images of a scene actively illuminated with an IR light pattern. Another infrared and/or visible light camera is configured with a notch filter to capture an image of the scene that is not actively illuminated with the IR light pattern.

In one or more aspects, a device comprises stereo IR cameras configured to sense stereo images of a scene actively illuminated with an IR light pattern, and a projector configured to output the IR light pattern. The device includes another camera configured to capture a non-actively illuminated image of the scene. The device also includes one or more image processing components configured to process the stereo images into depth data, and to output the depth data from the device.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards various hardware configurations that are well-suited for a high resolution, high frame rate, robust stereo depth system. One implementation includes two infrared (IR) cameras, a patterned-light projector, and an optional RGB or RGB/IR camera (where IR includes near infrared, or NIR) with or without broad-spectrum IR lighting. These components may be built into a single device.

Stereo images are captured from two cameras, using a projected light pattern to provide texture. There are general statistical properties of the light pattern, but in one embodiment, the exact pattern does not need to be known. As a result, the light projector need not be calibrated, which makes manufacturing cheaper. Further, the captured data do not degrade when another such device is projecting a pattern in the same room.

In various implementations, having a light projector provides benefits, but in some implementations the light projector is not needed, whereby if the device is taken to an environment that degrades the SNR (signal-to-noise ratio) of the projector, such as outside of a building, the device still functions to an extent (e.g., provides depth data, but with possibly degraded quality).

It should be understood that any of the examples herein are non-limiting. For example, while various camera and projector/emitter arrangements are exemplified herein, other arrangements may be used. Further, while RGB (red, green blue) color component data is described, data based upon other color schemes such as CMYK typically used in printing or 3D printing may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in active depth sensing, point clouds and image processing in general.

Figure 1:
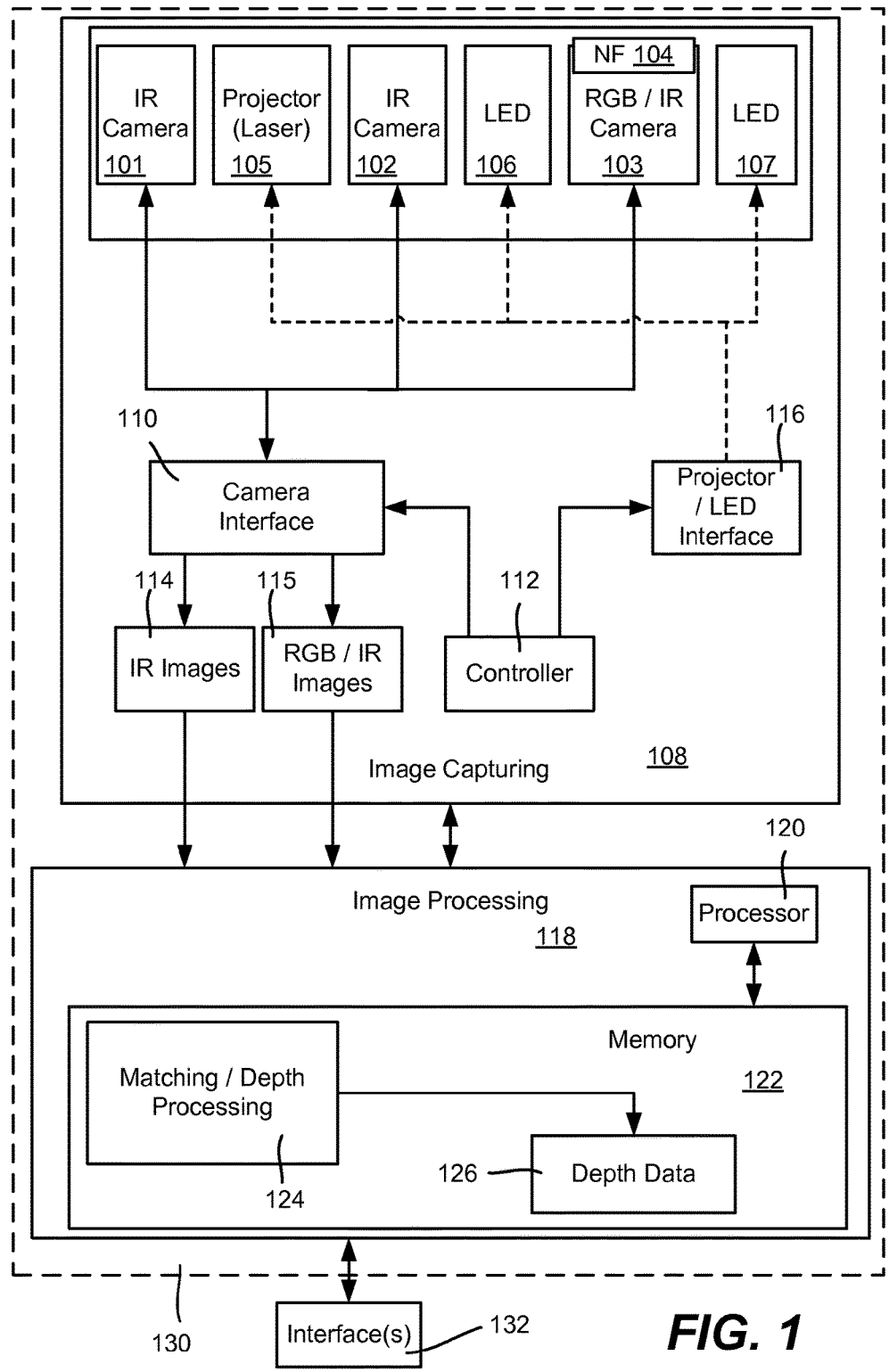
FIG. 1 is a block diagram representing example components that may be used to compute depth data from a device based upon active stereo, according to one or more example implementations.

FIG. 1 shows an example system in which stereo IR cameras 101 and 102, an RGB and/or IR camera 103 are arranged in conjunction with a projector 105, e.g., an IR laser diffracted by a diffractive optical element (DOE) into many thousands of dots, such as on the order of 100,000 such dots. Optionally a broad spectrum IR light source may be provided, such as one or more LEDs, e.g., LEDs 106 and 107 in FIG. 1.

In general, the two IR cameras 101 and 102 may be used for stereoscopic depth solving. The patterned-light projector 105 emits a pattern with statistical properties that are desirable for stereo matching.

In some implementations such as the one represented in FIG. 1, the RGB camera is optional, and can be included to provide color images. Alternatively, the optional RGB camera may be an RGB/IR camera 103 (FIG. 1) coupled with an optical notch filter 104 that filters out the projected light pattern, whereby the RGB/IR camera 103 outputs a color image and an IR image without the light pattern. To ensure a good signal in the IR range, the system (as in FIG. 1) may include a broad-spectrum IR light source, such as provided by the LEDs 106 and 107 in FIG. 1. The light source or sources need not necessarily be a broad spectrum IR light source, and instead, for example, may be narrower spectrum IR sources; any broad spectrum or narrower spectrum source suffices as long as not all of the IR light is filtered out by the notch filter 104.

An example device layout may be that represented in FIG. 1, e.g., (from left-to-right), the IR camera 101, the projector 105, the IR camera 102, an LED 106, the RGB/IR camera 103 and another LED 107. These components may be organized linearly, e.g., with an IR camera separation of 12 cm. The projector 105 is between and equidistant from the IR cameras 101 and 102, such as to reduce shadows. Each IR camera 101 and 102 has a band pass or long pass filter to reject visible light. As used herein, the term "linearly" includes "substantially linearly," in which a component that is linearly arranged relative to other components is at least partially over an imaginary line connecting those other components.

Continuing with this example, depth may be computed from the IR camera 102, closest to the RGB/IR camera 103. The RGB/IR camera 103 may be positioned as close to the IR camera 102 as the LED 106 will allow, and the other LED 107 may be as close as possible to the RGB/IR camera 103. The RGB/IR camera 103 has a notch filter 104 that removes the projected pattern from the image captured by the RGB/IR camera 103, e.g., to provide "clean" images.

Note that one otherwise generally identical arrangement may have only an RGB camera instead of the notch-filtered RGB/IR camera. Yet another otherwise generally identical arrangement may have only a notch-filtered IR camera, that is, without RGB.

It is understood that the order/arrangement of these components is only one example arrangement, and that other arrangements may be used, including some of those exemplified hereinafter. Thus, FIG. 1 is only showing components and one possible implementation, and no scale, relative dimensions, relative positions, combinations of devices within a housing and so on should be limited to anything exemplified in FIG. 1. For example, instead of a linear alignment of the components, one or more of the components may be above, below, recessed and/or protruding out relative to one or more other components, (although having at least the stereo cameras linearly aligned significantly simplifies the various matching/depth computations).

In the example of FIG. 1, the various exemplified components 101-107 are shown as incorporated into (or otherwise coupled to) an image capturing system or subsystem 108. The cameras are generally controlled, e.g., via camera interface 110 and controller 111, to capture stereo images synchronized in time (e.g., the cameras are "genlocked"). In one implementation the cameras 101 and 102 capture stereo infrared (IR) images 114, as IR is highly effective in depth estimation in varying light conditions and does not affect the visible appearance of the scene. Further, the camera 103 captures RGB/IR images 115. As can be readily appreciated and as exemplified below, in some scenarios such as studio environments, more than one such capturing system/subsystem may be present.

In FIG. 1, a projector 105 is shown that projects an IR pattern onto a scene, such as a pattern of spots (e.g., dots) or a line pattern, although other spot shapes and/or pattern types may be used. For purposes of brevity, dots are generally described hereinafter. By illuminating the scene with a relatively large number of distributed infrared dots, the IR cameras 102 and 103 capture texture data as part of the infrared image data.

The LEDs 106 and 107 generally illuminate the scene with IR light. This allows capturing a clean IR image in conditions where ambient IR light is otherwise low. While optional, if an RGB/IR camera (with lighting if needed) is present, an IR image without the light pattern (which is optically filtered) is captured. This may be useful for face and object recognition in environments with no visible light. At the same time, the IR stereo cameras 221 and 222 (FIG. 2) may use (optional) narrow band pass filters to reduce the ambient IR light to prevent it from interfering with the projected pattern.

In FIG. 1, the projector 105 is shown as coupled to the controller 112 via a projector interface 116; any such control may be as simple as turning the projector on and off or using energy saving modes, however more complex control such as pulsing, changing dot distribution, changing intensity and/or the like is feasible. The LEDs 106 and 107 may be similarly controlled to the extent desired.

The frames of images 114 and 115 captured by the cameras 101-103 are provided to an image processing system or subsystem 118. The image processing system or subsystem 118 includes a processor 120 and a memory 122, containing one or more image processing algorithms implemented in hardware/firmware logic and/or computer instructions, including a pixel matching/depth processing algorithm 124, which in general, outputs depth data 126, e.g., a depth map per frame.

In some implementations, the image processing system 118 and image capturing system or subsystem 108, or parts thereof, may be combined into a single device, represented by the dashed box 130. For example a home entertainment device may include all of the components shown in FIG. 1

(as well as others not shown, such as one or more microphones). This allows depth to be computed on the device, rather than on the computer controlling the device. In other implementations, parts (or all) of the image capturing system or subsystem 108, such as the cameras and projector may be a separate device that couples to a gaming console, personal computer, mobile device, dedicated processing device and/or the like.

Also shown in FIG. 1 is an interface 132 to the image processing system or subsystem 118, such as for connecting a keyboard, game controller, display, pointing device microphone for speech commands and/or the like as appropriate for a user to interact with an application or the like that uses the depth data 126.

With the above arrangement, the IR cameras are able to capture stereo images used for depth determination. For example, as described in U.S. published patent application no. 20130100256, hereby incorporated by reference, different dots or other projected elements have different features when captured, including intensity (brightness), depending on the distance from the projector to the reflective surfaces and/or the distance from the camera to the reflective surfaces. As is also known, the projected texture pattern (projected dots are one example used herein) in different images taken at the same time (e.g., with genlocked stereo cameras) may be correlated with one another, such as by matching small (e.g., RGB) patches between RGB images of the same scene captured at the same instant. Thus, with captured images from IR cameras calibrated (e.g., for triangulation), known algorithms can determine depth maps using disparities of certain features between matched dots or local intensity distribution. This is one way in which a depth map may be obtained via stereo image processing.

In the above arrangement, the projector need not be calibrated, only the cameras. This provides benefits over systems needing known projection pattern, as only needing to calibrate cameras is much easier, and the device can maintain calibration automatically. Notwithstanding, one or alternatives also may use known projection patterns.

Figure 2:
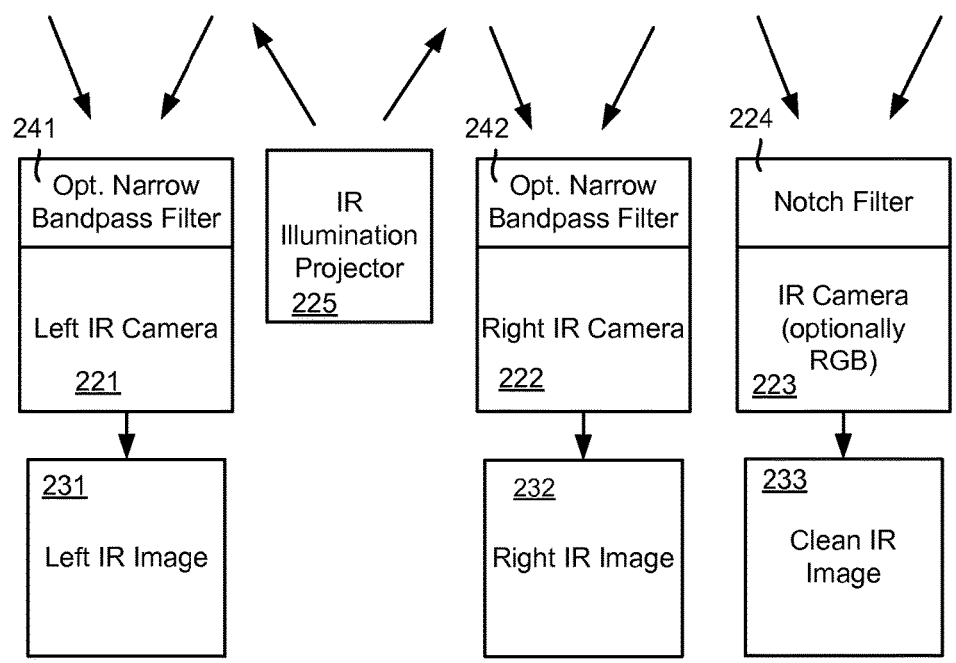
FIG. 2 is a representation of an example arrangement of cameras and a projector for capturing IR images according to one or more example implementations.

FIG. 2 shows an alternative arrangement without LEDs, (or possibly with LEDs above, below or to the side of the other components 221-225, rather than adjacent the IR camera 223 (with notch filter 224). Note that in this arrangement, the RGB camera is shown as optional. Thus, left and right actively-illuminated images 231 and 232, respectively, are provided for stereo matching, along with a clean IR image 233, which may or may not be captured with LED IR illumination. An RGB image is not shown to indicate that RGB is optional in this example arrangement.

FIG. 2 also shows the option of adding a narrow band pass filter 241 and 242 (tuned to the wavelength of the IR pattern) to each of the IR stereo cameras 221 and 222, respectively. This allows the projected IR pattern to be seen for stereo matching while attenuating other IR wavelengths, to improve matching in the presence of significant ambient IR lighting.

Figure 3A:
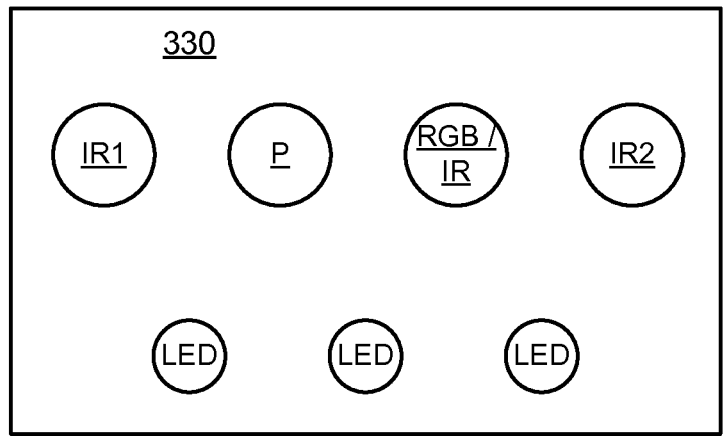
FIGS. 3A and 3B are representation of example alternative arrangements of cameras and one or more light sources that may be used by a device configured with a depth sensing system, according to one or more example implementations.

FIG. 3A exemplifies another possible alternative arrangement. In this example, a projector P and an RGB/IR camera (combined or only one of the two) are positioned between two stereo IR cameras IR1 and IR2. One or more optional LEDs are shown below (alternatively or more LEDs may be above) the cameras and the projector P.

Figure 3B:
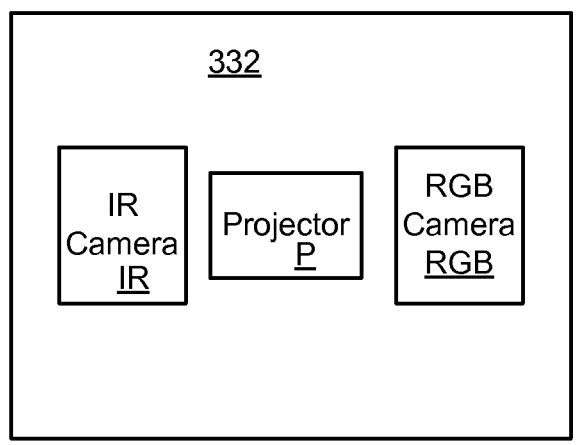

FIG. 3B shows an example arrangement in which only one IR camera (IR) and RGB camera (RGB) are provided in a device 332, along with a projector P. Instead of or in addition to RGB, a camera may comprise a notch-filtered clean IR camera. Natural features in the RGB image may be correlated with data in the IR image, providing depth estimation via passive plus active stereo matching. An arrangement that projects visible light, with two RGB cameras to provide stereo depth estimation may be used, such as for gesture-detection applications.

A light source may be calibrated with each camera, or some subset thereof. Each camera may thus provide a light source—camera depth map, as well as depth maps computed between them. For example, with two IR cameras IR1 and IR2 calibrated with a projector P, three depth maps IR1 and P, IR2 and P and IR1 and IR2 are available, which may be used to reduce errors, for example.

Figure 4A:
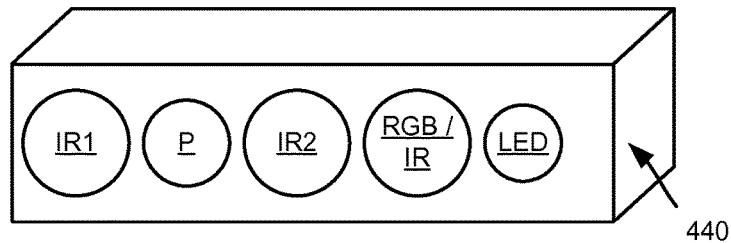
FIGS. 4A-4D are representation of example alternative linear arrangements of cameras and one or more light sources that may be used by a device configured with a depth sensing system, according to one or more example implementations.

In yet another possible implementation, a single LED is shown in a device 440 of FIG. 4A. This allows a closer positioning of the RGB/IR camera to one of the IR stereo cameras than in FIG. 1, for example. Any information in from the RGB/clean IR image that may assist in the correlation of dots in the stereo images will have less distortion/size differences because of the closer proximity.

Figure 4B:
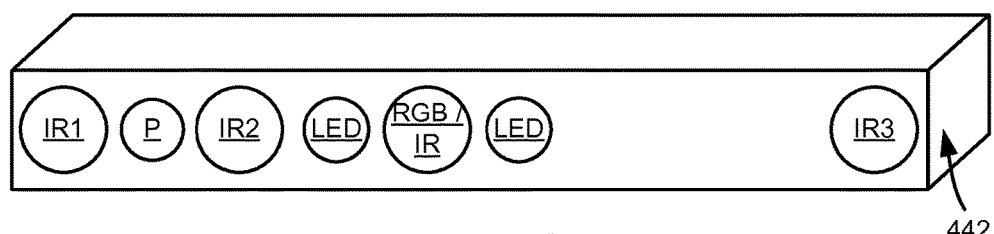

Turning to another aspect, the IR cameras are generally positioned a relatively close distance apart from one another, so as to determine depths with good accuracy in a typical room, e.g., from 0.5 m to 5.0 m, for example. However, other scenarios may call for detecting depths at further distances, whereby a wider separation of the cameras provides for better triangulation. In FIG. 4B, a third IR camera IR3 is positioned farther away from the other IR cameras, either IR2 or IR1, in a device 442. As a result, better depth estimation at larger distances may be computed, simply by using the IR3 image, whether matched with IR2's image, such as for somewhat far distances, or with IR1's image, such as for even further distances, may be used. For example, IR1 and IR2 can be used conventionally to compute a depth map, with those depths in the map that are larger recomputed using IR3's image data for more accurate estimation.

Figure 4C:
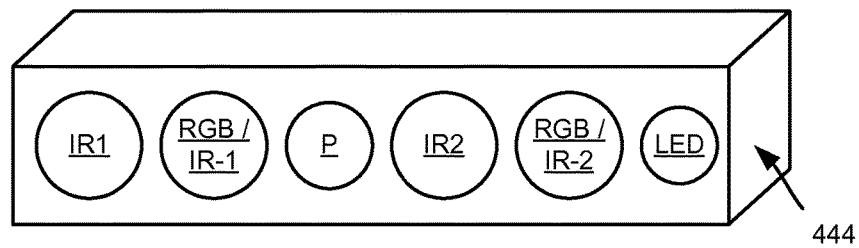
Figure 4D:
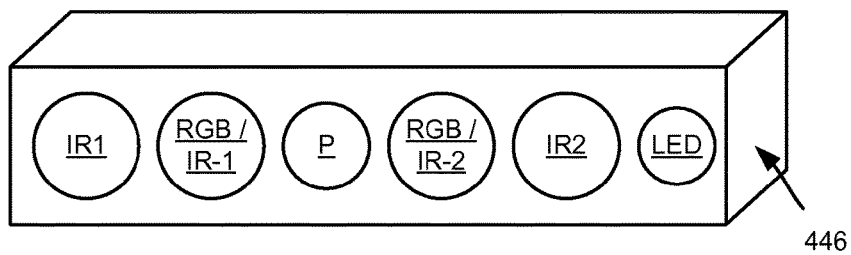

FIGS. 4C AND 4D show other alternative implementations, in which two IR cameras and two RGB (or RGB/IR) cameras are present in devices 444 and 446, respectively. Note that the exemplified patterns are IR-RGB-IR-RGB (FIG. 4C) and IR-RGB-RGB-IR (FIG. 4D); the projector and LED, if present, may be positioned as shown or in other locations, and, for example, there may be more than one LED.

Figure 5:
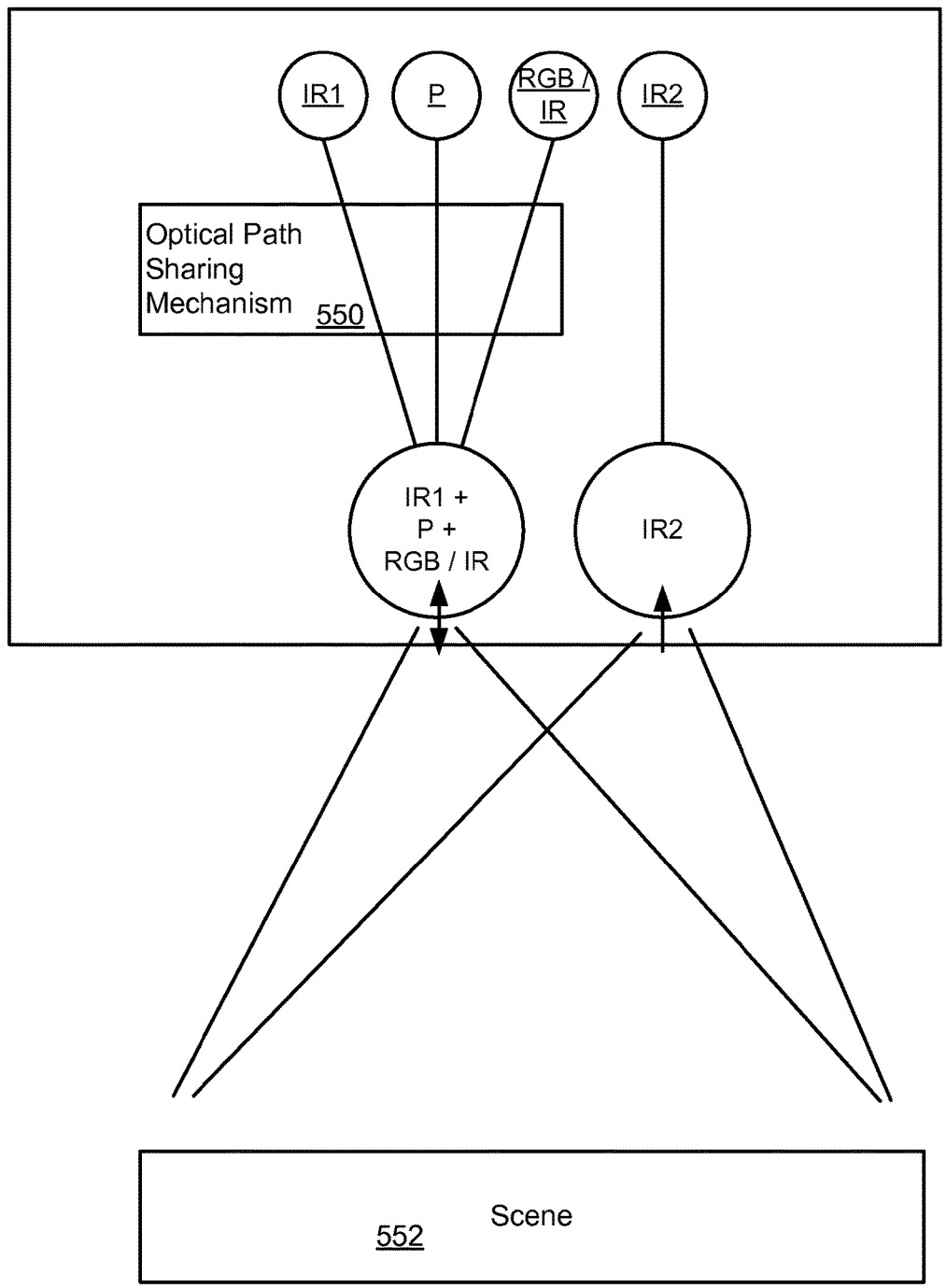
FIG. 5 is a representation of a projector and cameras sharing an optical path for use in a depth sensing system, according to one or more example implementations.

In another aspect, FIG. 5 shows components sharing the same optical path, which may provide various benefits. In FIG. 5, an optical path sharing mechanism 550 is shown, comprising any techniques, mechanisms or combinations thereof that may be used for this purpose.

The example in FIG. 5 has one IR camera IR1, a projector P and an RGB/IR camera sharing the same optical path to a scene 552. The other IR camera IR2 has a different path to provide the stereo data. Having the projector on the same optical path reduces shadows; having the RGB/IR camera on the same optical path eliminates any distortion and/or size differences between the RGB/clean IR image and IR1's image. In other alternatives, any two of the components may share an optical path rather than the three illustrated ones, although benefits are likely obtained by having IR1 share the path.

Figure 6:
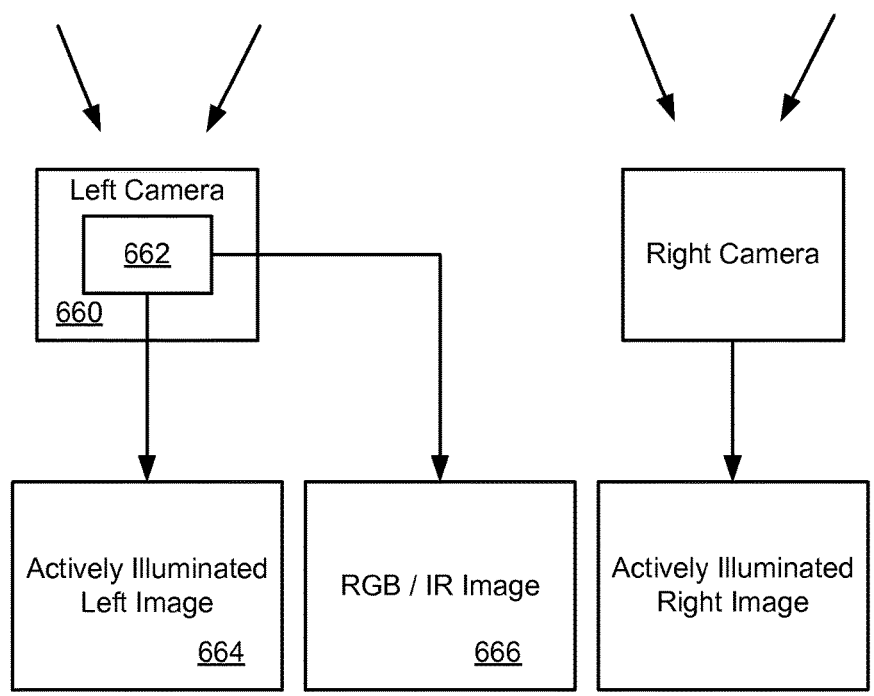
FIG. 6 is a representation of a camera providing two images via one optical path for use in a depth sensing system, according to one or more example implementations.

The optical path sharing mechanism 550 may be based upon reflection, e.g., via mirrors. As another alternative, an optical path may be the same for an actively illuminated image and a non-actively illuminated image by having one camera 660 (FIG. 6) configured with optics/filtering to provide separate images. Thus, instead of an IR and an RGB/IR camera being separate physical components device that each capture images, a mechanism 662 (e.g., in the left camera 660) may split the incoming light between two sensors, with each sensor having a different spectral response, thereby producing two aligned images 664 and 666. Alternatively, the mechanism 662 may be in a single camera 660 with a Bayer pattern on the sensing pixels, whereby some pixels receive light that includes actively illuminated light from the projector, and other pixels that do not. From such a single sensor it is possible to produce the actively illuminated image 664 and the RGB/clean IR image 666.

The system can be adapted to various scenarios by providing a device with the components that are appropriate for a given scenario. Further, the system itself can adapt. For example, in some situations LED IR illumination, and/or active pattern illumination may be turned on or off as needed. Depth sensing by processing stereo images may still be performed regardless of whether active projection is turned off or on but is overwhelmed by ambient light. One or more configurations allow for both accurate depth at both close/short range and far long-range depth by having multiple image pairs at different perspectives to choose from in stereo matching.

Further, unlike calibrated projector and light sensors, some of the implementations described herein as well as others not explicitly described may benefit from multiple devices, or at least multiple projectors in the same room, as more texture is added by more projectors. Even if the number of projectors is such that textures begin to blur, however, depth sensing may occur via processing the stereo images and/or the RGB/IR clean image. In other implementations, different wavelength projectors along with corresponding filtering may be used to capture only as much active illumination as desired.

Figure 7:
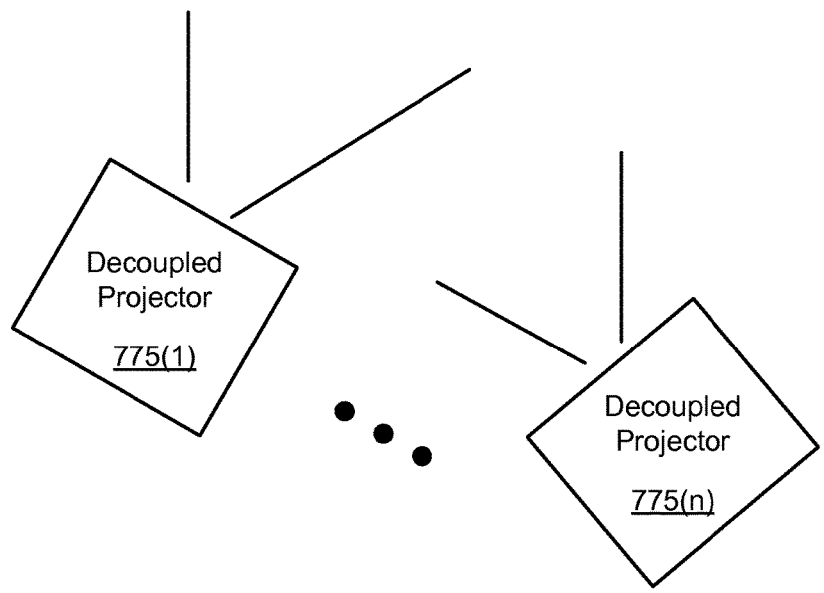
FIG. 7 is representation of one or more projectors decoupled from a device containing cameras that sense active illumination from the one or more projectors, according to one or more example implementations.
Figure 7:
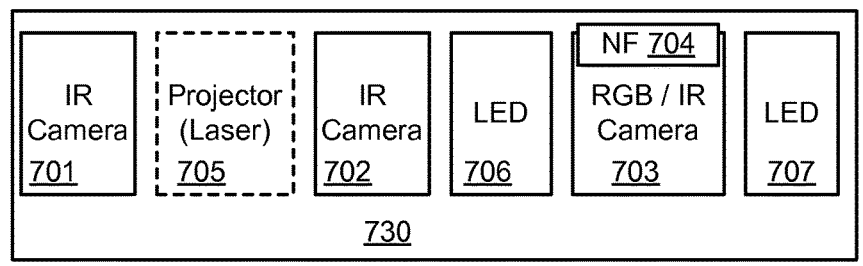

In another implementation generally represented in FIG. 7, one or more projectors 775(1)-775(n) may be decoupled from the other components of a device 730. The other projector or projectors 775(1)-775(n) may be positioned at various places in a room, at different heights, angles and so forth to provide a desired result. A "lamp" or set thereof may illuminate a whole room for multiple sensing devices and/or one for or more moving sensing devices to capture actively illuminated images. Note that the device 730 shows an optional projector 705 as indicate by the dashed box, which may or may not also be present as a projector.

Example Operating Environment

Figure 8:
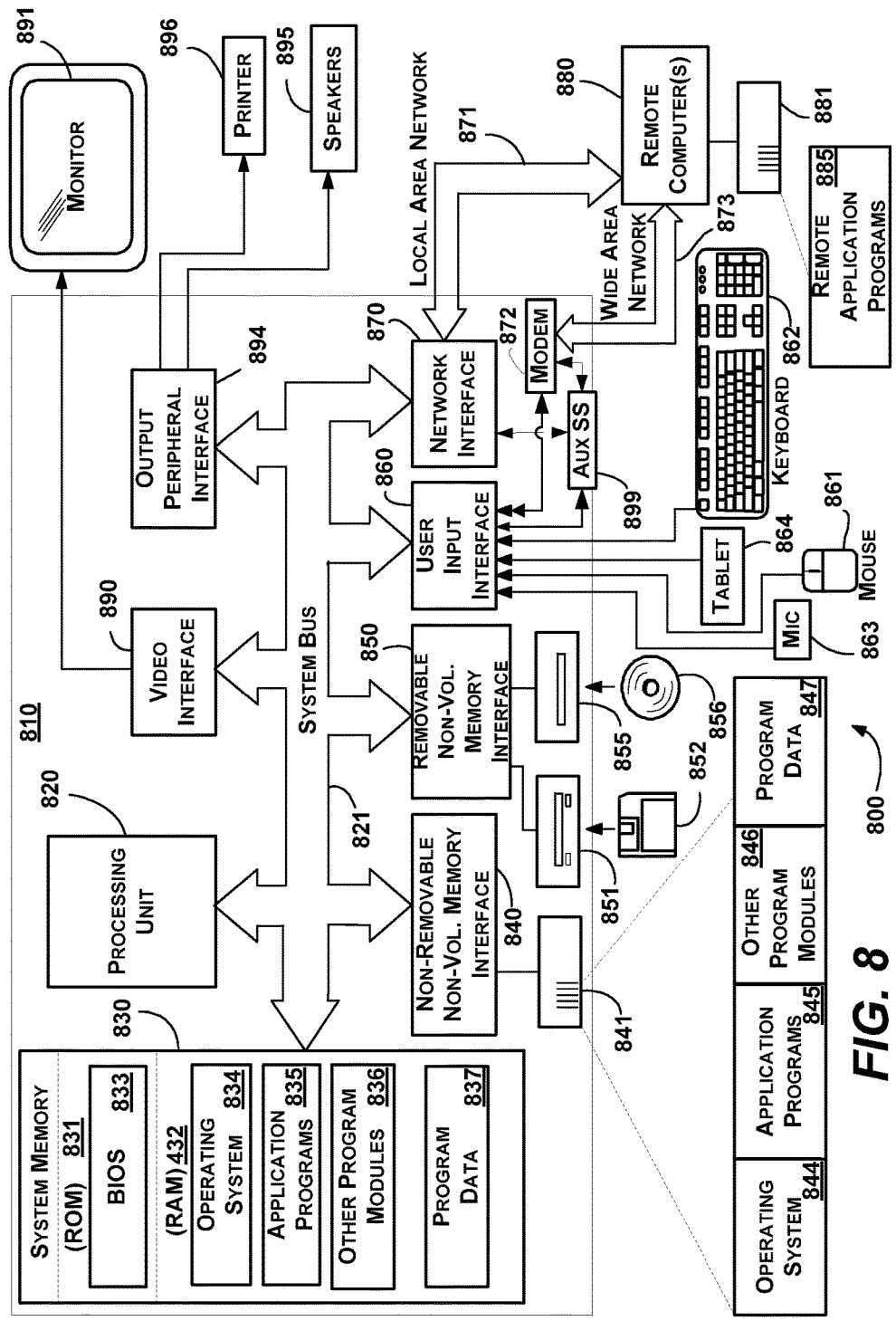
FIG. 8 is a block diagram representing an exemplary non-limiting computing system or operating environment into which one or more aspects of various embodiments described herein can be implemented.

FIG. 8 illustrates an example of a suitable computing and networking environment 800 into which computer-related examples and implementations described herein may be implemented, for example. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the example operating environment 800.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an example system for implementing various aspects of the invention may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component 874 such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are examples and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System on chip systems (SOCs), Complex Programmable Logic Devices (CPLDs), etc.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising:
   a projector configured to illuminate a scene with an unknown light pattern, the unknown light pattern emitted at a predetermined infrared (IR) wavelength;
   a first IR camera configured to capture a first image of the scene illuminated with the unknown light pattern;
   a second IR camera configured to capture a second image of the scene illuminated with the unknown light pattern;

an optical notch filter configured to block the predetermined IR wavelength and pass other wavelengths of light;

a third IR camera coupled to the optical notch filter, the third IR camera configured to capture a third image of the scene illuminated with the unknown light pattern, the third image comprising an IR image without the unknown light pattern; and an image processing system configured to compute depth data based upon the first, second, and third images captured by the first, second, and third IR cameras, and output the depth data from the device.

2. The system of claim 1 further comprising a visible light spectrum camera configured to capture a color image of the scene.

3. The system of claim 2, wherein the third IR camera and the visible light spectrum camera are combined into a single camera.

4. The system of claim 1 further comprising at least one IR light source configured to illuminate the scene with at least some IR light at a second IR wavelength that is not filtered out by the optical notch filter.

5. The system of claim 1, wherein at least one of the first, second, and third IR cameras is coupled to a narrow bandpass filter.

6. The system of claim 1, wherein at least two of the first, second, and third IR cameras are arranged as stereo IR cameras.

7. The system of claim 6, wherein the projector is positioned between the stereo IR cameras.

8. The system of claim 6 further comprising an additional camera configured to capture a fourth image of the scene, wherein the additional camera is positioned adjacent one of the first and second IR cameras.

9. The system of claim 6 further comprising an IR light source configured to illuminate the scene with at least some IR light at a second IR wavelength that is not filtered out by the optical notch filter, wherein the IR light source is positioned adjacent one of the first and second IR cameras, and the third IR camera is positioned adjacent the IR light source.

10. The system of claim 6 further comprising first and second IR light sources configured to illuminate the scene with at least some IR light at a second wavelength that is not filtered out by the optical notch filter, wherein the first IR light source is positioned adjacent one of the first and second IR cameras, and the third IR camera is positioned between the first IR light source and the second IR light source.

11. The system of claim 1 wherein first, second, and third IR cameras and projector are incorporated into a single device.

12. The system of claim 11 wherein the device includes an image processing system configured to compute the depth data within the device.

13. The system of claim 1 wherein the first, second, and third IR cameras and the projector are arranged linearly in a single device, and wherein the device comprises at least one IR light source configured to illuminate the scene with at least some IR light at a second wavelength that is not filtered out by the optical notch filter.

14. A system comprising:

a plurality of infrared (IR) cameras configured to sense stereo images of a scene illuminated with an unknown IR light pattern, the unknown IR light pattern emitted at a predetermined IR wavelength;

a plurality of narrow bandpass filters corresponding to the plurality of IR cameras, wherein a respective narrow bandpass filter of the plurality of narrow bandpass filters is coupled to a respective IR camera of the plurality of IR cameras, and wherein the plurality of narrow bandpass filters pass the predetermined IR wavelength and block other IR wavelengths of light;

a notch-filtered camera configured with a notch filter to capture a clean image of the scene illuminated with the unknown IR light pattern, the clean image comprising an IR image without the unknown IR light pattern; and an image processor configured to compute depth data based upon the stereo images captured by the plurality of IR cameras and the clean image captured by the notch-filtered camera, and output the depth data from the device.

15. The system of claim 14 further comprising a projector configured to illuminate the scene with the unknown IR light pattern.

16. The system of claim 15, wherein the plurality of IR cameras, the notch-filtered camera, and the projector are arranged linearly in a device, and wherein the projector is positioned between two of the plurality of IR cameras.

17. The system of claim 14, wherein the notch-filtered camera configured with the notch filter is further configured to capture a visible light spectrum color image.

18. The system of claim 14 further comprising at least one IR light source that emits at least some IR light at a second wavelength that is not filtered out by the notch filter.

19. The system of claim 14, wherein the notch filter is configured to block the predetermined IR wavelength and pass visible and other IR wavelengths of light.

* * * * *